US010705969B2

(12) United States Patent
Chang et al.

(10) Patent No.: US 10,705,969 B2
(45) Date of Patent: Jul. 7, 2020

(54) DEDUPE DRAM CACHE

(71) Applicant: Samsung Electronics Co., Ltd., Suwon-si, Gyeonggi-do (KR)

(72) Inventors: Mu Tien Chang, Santa Clara, CA (US); Andrew Chang, Los Altos, CA (US); Dongyan Jiang, San Jose, CA (US); Hongzhong Zheng, Los Gatos, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 15/934,940

(22) Filed: Mar. 23, 2018

(65) Prior Publication Data

US 2019/0227941 A1 Jul. 25, 2019

Related U.S. Application Data

(60) Provisional application No. 62/619,723, filed on Jan. 19, 2018.

(51) Int. Cl.
*G06F 12/08* (2016.01)
*G06F 12/0891* (2016.01)
*G06F 3/06* (2006.01)

(52) U.S. Cl.
CPC ........ *G06F 12/0891* (2013.01); *G06F 3/0611* (2013.01); *G06F 3/0641* (2013.01); *G06F 3/0673* (2013.01); *G06F 2212/1024* (2013.01); *G06F 2212/60* (2013.01)

(58) Field of Classification Search
CPC ......... G06F 12/0891; G06F 2212/1024; G06F 3/0611; G06F 3/0673; G06F 2212/60; G06F 3/0641
USPC .......................................................... 711/133
See application file for complete search history.

(56) References Cited

U.S. PATENT DOCUMENTS 8,732,403 B1 * 5/2014 Nayak .................. G06F 3/0641 711/135
9,116,812 B2 8/2015 Joshi et al.
9,304,914 B1 4/2016 Douglis et al.
9,390,116 B1 7/2016 Li et al.
9,401,967 B2 7/2016 Sabaa et al.
2015/0074339 A1 3/2015 Cheriton
2016/0224588 A1 8/2016 Harijono et al.
2017/0091117 A1 3/2017 Cain, III et al.

* cited by examiner

*Primary Examiner* — Hua J Song
(74) *Attorney, Agent, or Firm* — Renaissance IP Law Group LLP

(57) ABSTRACT

A dedupable cache is disclosed. The dedupable cache may include cache memory including both a dedupable read cache and a non-dedupable write buffer. The dedupable cache may also include a deduplication engine to manage reads from and writes to the dedupable read cache, and may return a write status signal indicating whether a write to the dedupable read cache was successful or not. The dedupable cache may also include a cache controller, which may include: a cache hit/miss check to determine whether an address in a request may be found in the dedupable read cache; a hit block to manage data accesses when the requested data may be found in the dedupable read cache; a miss block to manage data accesses when the requested data is not found in the dedupable read cache; and a history storage to store information about accesses to the data in the dedupable read cache.

21 Claims, 11 Drawing Sheets

DEDUPE DRAM CACHE

RELATED APPLICATION DATA

This application claims the benefit of U.S. Provisional Patent Application Ser. No. 62/619,723, filed Jan. 19, 2018, which is incorporated by reference herein for all purposes.

FIELD

The inventive concepts relate generally to data caching, and more particularly to using dedupable memory in caches.

BACKGROUND

Dedupable memory provides a way to increase the "available" memory in a system. By detecting duplicate data and storing only a single copy of the data, storage that might otherwise be used to store the duplicate data copies may be used to store other data. More particularly, the various different applications requesting access to the same data values, even though the requests use different addresses, may all be directed to the same physical address. Since two, three, or more different logical addresses may map to the same physical address, the storage that would otherwise be needed for the additional copies of the data may be used to store other data, making it appear that the memory stores more overall data than it is physically capable of storing.

But dedupable memory introduces its own complications as well. Managing which addresses point to the same data is difficult, and data accesses, both reads and writes, may end up being slower than in other forms of storage. While not necessarily a huge difficulty when using data that is relatively slow to access (such as hard disk drives), this delay may be a significant limitation when applied to faster storage devices. And the faster the storage device normally operates, the greater the overall implication of data deduplication may become. For example, Dynamic Random Access Memory (DRAM) accesses would be much more sensitive to the delays associated with data deduplication Solid State Disks (SSDs) or other forms of flash memory, which in turn are more sensitive to delay than hard disk drives.

A need remains for a way to use dedupable memory in caches to speed up access to data in backend memory.

DETAILED DESCRIPTION

Figure 1:
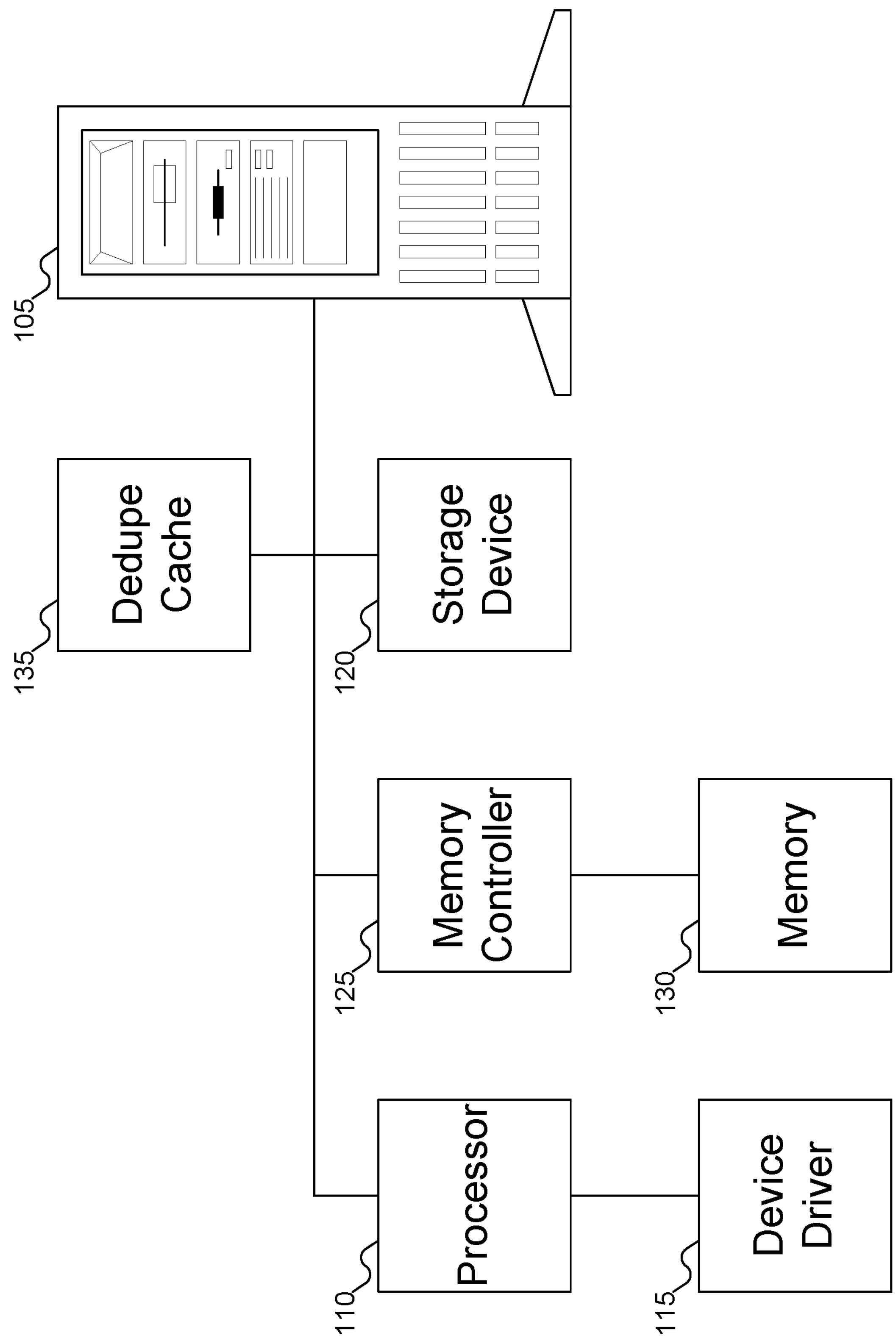
FIG. 1 shows a machine using a deduplication cache, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Deduplicated Dynamic Random Access Memory (DRAM) provides for enhanced logical capacity within a given DRAM unit, but is generally slower than ordinary DRAM operations. This slower performance might prevent the use of deduplicated DRAM as an ordinary DRAM cache.

To address these concerns, the memory in the deduplicated DRAM cache may be divided into a dedupe DRAM read cache and a non-deduplicated write buffer. Because writes to dedupe DRAM are slow, conventional DRAM may be used as a write buffer (WB). Read requests would be serviced (mostly) from the deduplicated read cache (RC), but writes would be serviced by the normal DRAM WB.

For example, if the physical DRAM is 8 gigabytes (GB), the physical DRAM may be partitioned into a 4 GB physical dedupe DRAM RC (offering a total of 8 GB virtual capacity), and a 4 GB physical DRAM WB. The dedupe engine would only operate the dedupe mechanism for the specific 4 GB range used by the dedupe DRAM RC.

But note that even though dedupe DRAM may be used for a read cache, writes may still happen that affect the dedupe DRAM. For example, a 64 byte (B) update from the host may affect data stored in the dedupe DRAM RC (a write hit), or a 2 kilobyte (KB) fill from backend high capacity memory may be needed when the data is not currently in the dedupe DRAM RC (a read miss). To address situations that write to the dedupe DRAM RC, new WR_Status signal may be used: the dedupe engine returns an ACK (acknowledgment) if the write succeeded, otherwise it returns a NAK (no acknowledgement). If the cache controller receives the NAK, it will cancel the cache fill (i.e., the 2 KB fill will not be cached).

Therefore, to process a dedupe DRAM RC write hit, the dedupe DRAM cache may update the RC metadata to make cache line invalid, and then write 64 B of zeros (invalidating the cache line) to the dedupe engine (this may also involve garbage collecting the dedupe DRAM RC). After this process completes, the dedupe DRAM cache may proceed as though there were not dedupe DRAM RC write hit (i.e., the dedupe DRAM cache may proceed as though there were a dedupe DRAM RC write miss).

To process a dedupe DRAM RC fill, the dedupe DRAM cache may read the history and RC metadata to select a cache line to evict from the dedupe DRAM RC. If the selected cache line contains valid data, then the dedupe DRAM cache may update the RC metadata to mark the cache line as invalid and write 2 KB of zeroes to the dedupe engine to invalidate the cache line. Then (once the selected cache line is invalid), the dedupe DRAM cache may write the new cache line data to the dedupe engine, with the dedupe engine returning the WR_Status signal. If the dedupe engine returned an ACK, then the dedupe DRAM cache may update the RC metadata to mark the cache line as valid. Otherwise, if the dedupe engine returned a NAK, the dedupe DRAM cache may drop the request to write the data to the dedupe DRAM RC.

The above inventive concept works to address the problem of potentially lower write performance using dedupable memory. But the use of dedupable memory also raises another problem: that a write operation is not guaranteed. For example, assume that a dedupe DRAM RC fill operation is to be performed, but every cache line in the dedupe DRAM RC stores valid data. If the cache line selected for invalidation points to data that has been deduplicated—that is, the data pointed to by that cache line is also pointed to by other cache lines—then invalidating that cache line will not free up any physical memory. Alternatively, in a dedupe RC write hit, the deduplication engine might not be able to overwrite the cache line with zeroes, if the data is also being used by another cache line. There are two solutions to this problem of a lack of write completion guarantee: either accept that writes are not guaranteed, or retry the write operation in an attempt to guarantee a write operation completes.

To achieve the latter, a write retry may be performed. If the write fails—that is, the deduplication engine returns a NAK signal from the attempted write—then another cache line may be selected for invalidation (possibly involving writeback, depending on the implementation of the dedupe DRAM cache) and the write retried.

Since invalidating another cache line might result in the deduplication engine being able to complete the write operation to the dedupe DRAM RC, the write retry might succeed. But if the cache line selected for invalidation as part of the write retry points to data that is also subject to deduplication, then the write retry might fail again. Thus, this process of invalidating a cache line and retrying the write may be performed repeatedly for as many times as desired. Typically, the end conditions for the retry process are: a successful write (as indicated by an ACK signal from the deduplication engine), evicting every cache line in a set, or attempting a predetermined number of write retries. If either of the latter two conditions occurs, the dedupe DRAM cache may simply default to returning a result to the processor without successfully completing the desired write operation.

FIG. 1 shows a machine using a deduplication cache, according to an embodiment of the inventive concept. In FIG. 1, machine 105 is shown. Machine 105 may include processor 110. Processor 110 may be any variety of processor: for example, an Intel Xeon, Celeron, Itanium, or Atom processor, an AMD Opteron processor, an ARM processor, etc. While FIG. 1 shows a single processor 110 in machine 105, machine 105 may include any number of processors, each of which may be single core or multi-core processors, and may be mixed in any desired combination. Processor 110 may run device driver 115, which may support access to storage device 120: different device drives may support access to other components of machine 105.

Machine 105 may also include memory controller 125, which may be used to manage access to main memory 130. Memory 130 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 130 may also be any desired combination of different memory types. Machine 105 may further include dedupe cache 135 (which may also be called a "deduplication cache"), as described below.

Although FIG. 1 depicts machine 105 as a server (which could be either a standalone or a rack server), embodiments of the inventive concept may include machine 105 of any desired type without limitation. For example, machine 105 could be replaced with a desktop or a laptop computer or any other device that may benefit from embodiments of the inventive concept. Machine 105 may also include specialized portable computing devices, tablet computers, smartphones, and other computing devices.

Figure 2:
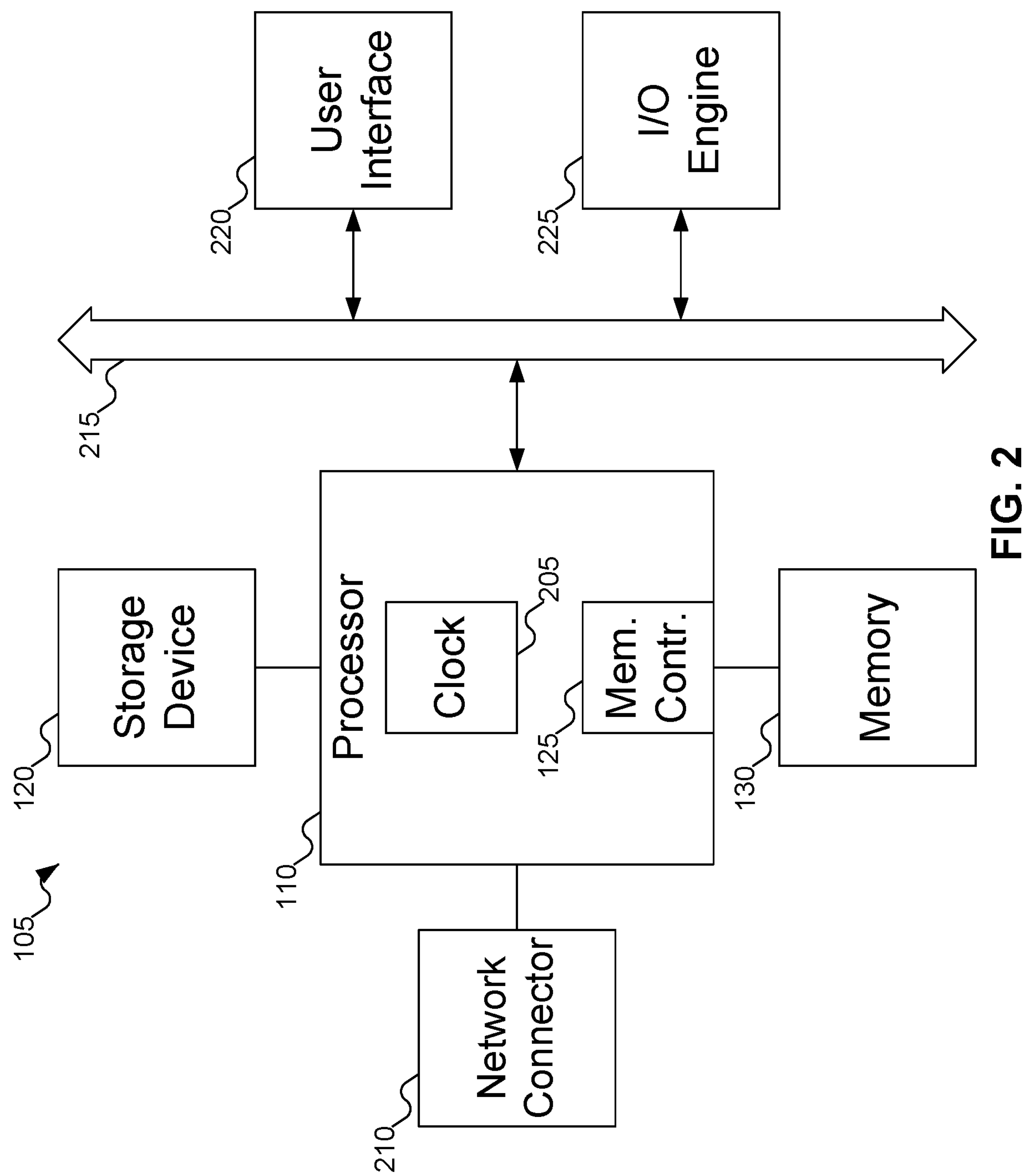
FIG. 2 shows additional details of the machines of FIG. 1.

FIG. 2 shows additional details of machine 105 of FIG. 1. In FIG. 2, typically, machine 110 includes one or more processors 110, which may include memory controllers 125 and clocks 205, which may be used to coordinate the operations of the components of machine 105. Processors 110 may also be coupled to memories 130, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output interface ports that may be managed using Input/Output engines 225, among other components.

Figure 3:
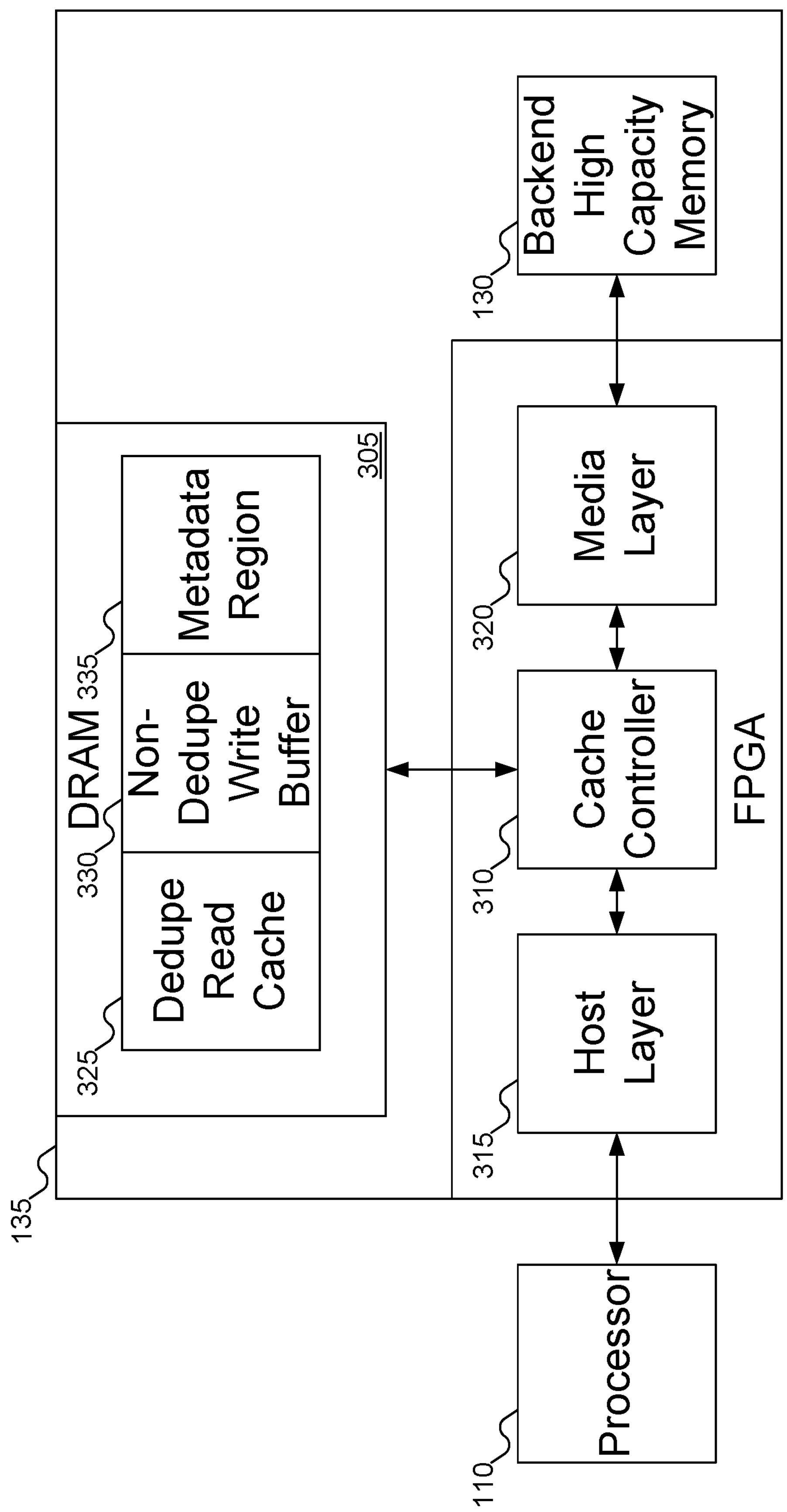
FIG. 3 shows an example layout of the deduplication cache of FIG. 1.

FIG. 3 shows an example layout of deduplication cache 135 of FIG. 1. In FIG. 3, deduplication cache 135 may be broken down into four general components: DRAM 305, cache controller 310, host layer 315, and media layer 320. DRAM 305 acts as the actual memory for deduplication cache 135, and may be divided into three regions: dedupable read cache 325, non-dedupable write buffer 330, and metadata region 335. Dedupable read cache 325 may be used as deduplication memory to store data that may be read from deduplication cache 135 by processor 110. Non-dedupable write buffer 330 may be used as conventional (i.e., non-deduplication) memory to store data to be written from processor 110. Metadata region may store information about the cache lines in dedupable read cache 325 and non-dedupable write buffer 330: for example, which cache lines are valid vs. invalid, and which cache lines are buffered for writing to backend high capacity memory 130. Not shown in FIG. 3 is the deduplication engine, which manages the actual writing of data to dedupable read cache 325: the deduplication engine is discussed with reference to FIG. 4 below.

Dedupable read cache 325, non-dedupable write buffer 330, and metadata region 335 may include any desired percentages of DRAM 305. For example, if DRAM 305 includes a total of 8 gigabytes (GB), dedupable read cache 325 and non-dedupable write buffer 330 might each include approximately 4 GB of storage (metadata region 335 requires a relatively small amount of DRAM 305). Given an expected dedupe ratio, dedupable read cache 325 may then simulate a greater capacity than its physical capacity. For example, if dedupable read cache 325 includes 4 GB of physical memory and has a target dedupe ratio of 2.0, dedupable read cache 325 may simulate a virtual memory of 8 GB. Note that deduplication cache 135 supports as many cache lines as the virtual capacity of dedupable read cache 325, which may (and is likely to) exceed the number of cache lines the physical capacity of dedupable read cache 325 could support.

While FIG. 3 shows DRAM 305 including both dedupable read cache 325 and non-dedupable write buffer 330 and suggests that they offer different functionality, there may also be some functional overlap. For example, in some embodiments of the inventive concept, while non-dedupable write buffer 330 may store data written from processor 110 (and that eventually should be written to backend high capacity memory 130), non-dedupable write buffer 330 may also act as a "read cache" (albeit not subject to deduplication), from which data may be also read. Therefore, non-dedupable write buffer 330 might be considered more than "transient" storage for data to be written to backend high capacity memory 130. In such embodiments of the inventive concept, any reference to checking dedupable read cache 325 for a particular cache line may be understood to check for the cache line from non-dedupable write buffer 330 as well, and to read the data from either dedupable read cache 325 or non-dedupable write buffer 330 as appropriate, and data might be written to backend high capacity memory 130 only when non-dedupable write buffer 330 is full or when a cache line in non-dedupable write buffer 330 is being invalidated to make room for a new cache line. In such embodiments of the inventive concept, backend high capacity memory 130 may be accessed for the requested data only if the data is not stored in either dedupable read cache 325 or non-dedupable write buffer 330.

Cache controller 310 may act as the "brains" behind deduplication cache 135, managing what data is written or read, selecting cache lines for invalidation or writing, and so on. Cache controller 310 may use host layer 315 to interact with (i.e., receive requests/data from and send data to) processor 110, and media layer 320 to interact with memory 130 (labeled "backend high capacity memory" in FIG. 3). Memory 130 may be part of the module containing deduplication cache 135, or it may be separate from deduplication cache 135 (and communicated with via a communication path).

As shown in FIG. 3, cache controller 310, host layer 315, and media layer 320 may be implemented using a field programmable gate array (FPGA). But embodiments of the inventive concept may support any desired implementation, including other hardware designs (such as using a Programmable Read Only Memory (PROM) or any variant thereof such as Erasable PROM (EPROM) or Electrically Erasable PROM (EEPROM), or a specially designed circuit) and software designs. In addition, while FIG. 3 shows cache controller 310, host layer 315, and media layer 320 implemented using a single FPGA, embodiments of the inventive concept may support implementations using multiple separate components that are then connected using communication paths, such as network interconnects.

Figure 4:
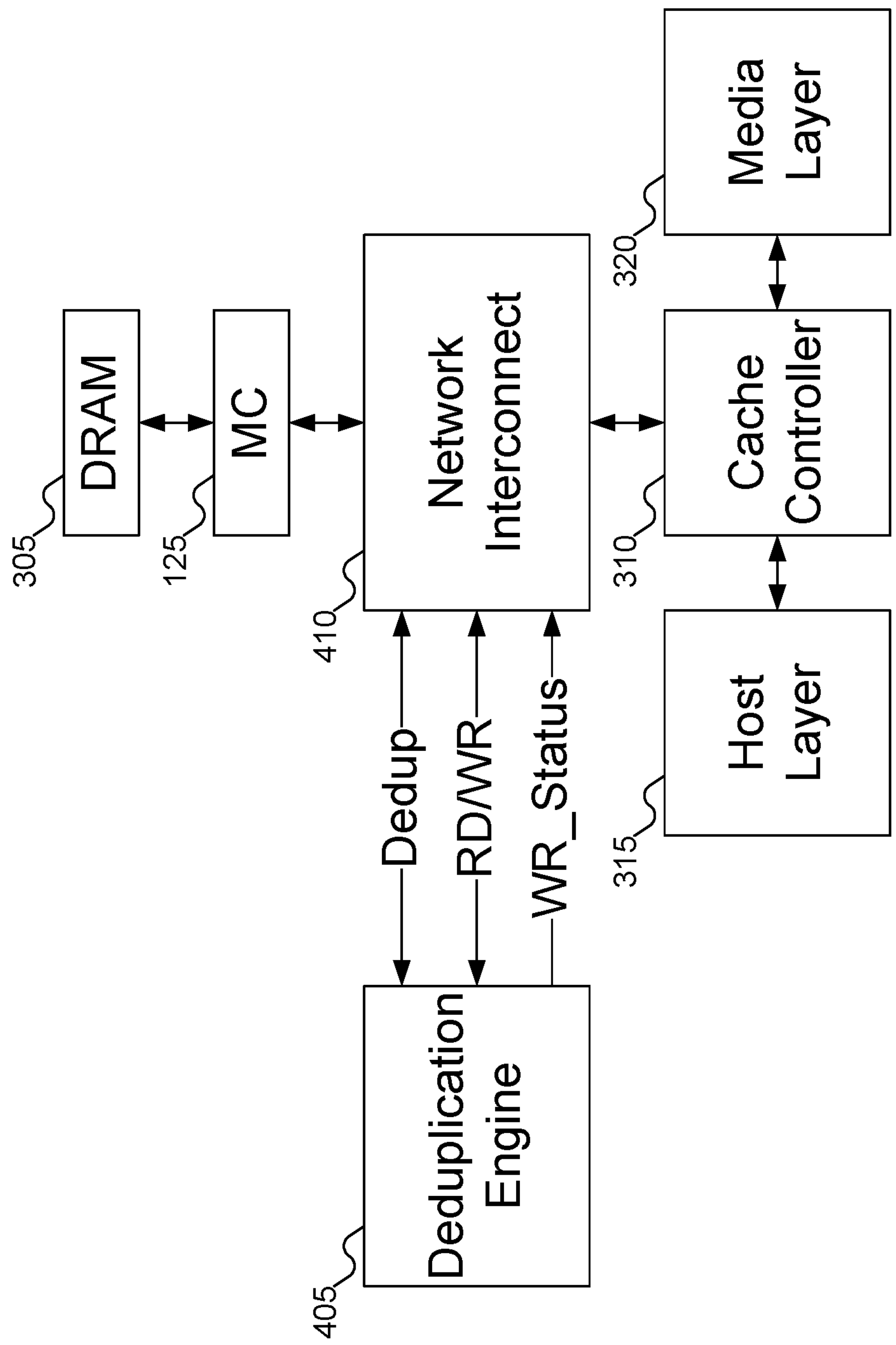
FIG. 4 shows the deduplication cache of FIG. 1 with a deduplication engine included.

FIG. 4 shows deduplication cache 135 of FIG. 1 with a deduplication engine included. In FIG. 4, DRAM 305, cache controller 310, host layer 315, and media layer 320 may be the same as those components shown in FIG. 3, and memory controller 125 may be the same as memory controller 125. But in addition, in FIG. 4, deduplication engine 405 and network interconnect 410 are shown. Network interconnect 410 may provide communication between DRAM 305, cache controller 310, and deduplication engine 405. Deduplication engine 405 may manage the reading of data from, and the writing of data to, portions of DRAM 305 that include deduplicated memory (such as dedupable read cache 325 of FIG. 3) (note that portions of DRAM 305 that do not include deduplicated memory may be accessed directly, without using deduplication engine 405).

As discussed above, deduplication engine 405 manages deduplicated memory. To that end, deduplication engine 405 may support signals instructing deduplication engine 405 to perform deduplication (shown as the signal labeled "Dedup" in FIG. 4) and read/write instructions that specify an address to access and (potentially) data to use (shown as the signal labeled "RD/WR" in FIG. 4). But in addition, deduplication engine 405 may also provide a write status signal (shown as the signal labeled "WR_Status" in FIG. 4). The write status signal may be used to indicate whether a particular write operation succeeded or failed. The use of the write status signal is discussed further with reference to FIG. 5 below.

Figure 5:
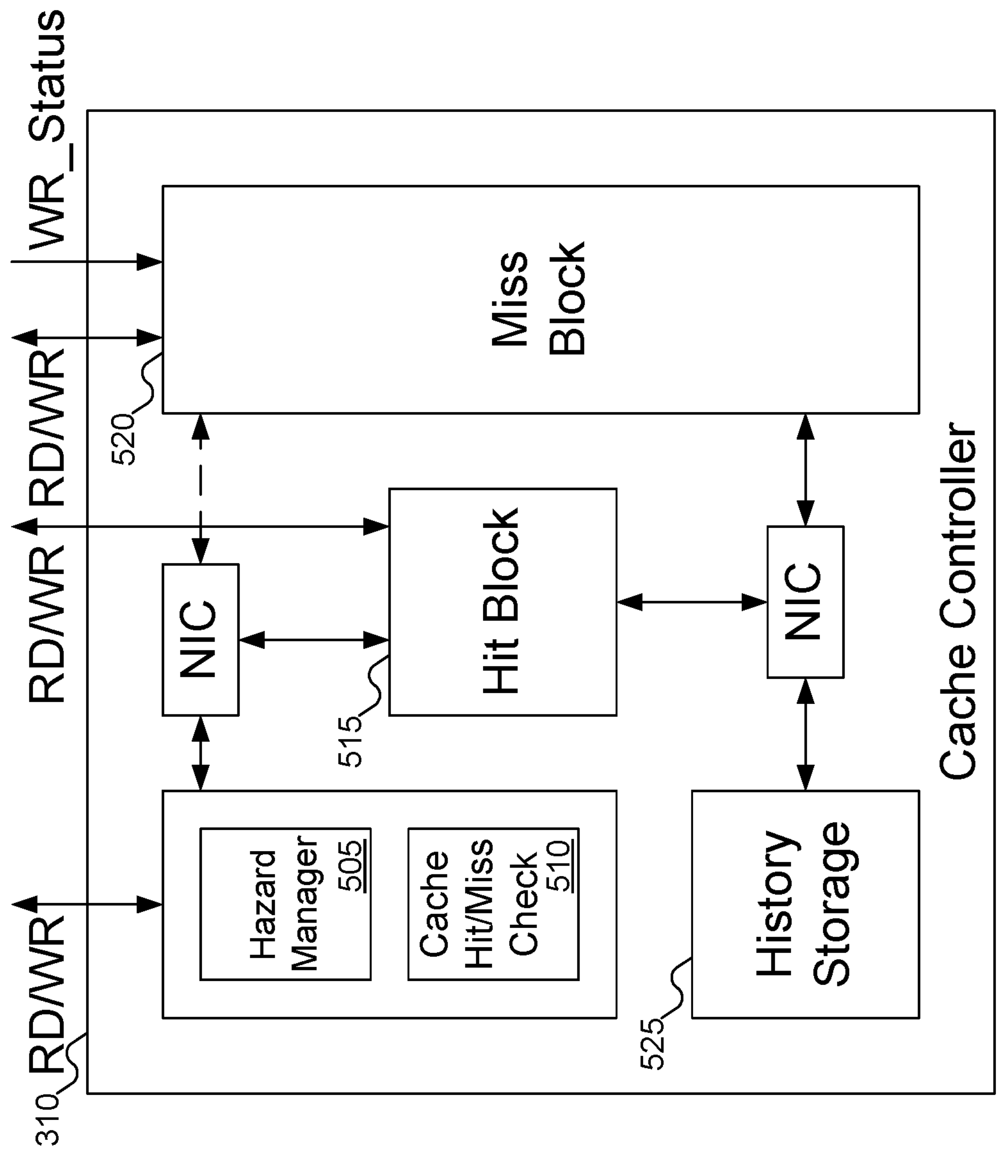
FIG. 5 shows details of the cache controller of FIGS. 3-4.

FIG. 5 shows details of cache controller 310 of FIGS. 3-4. In FIG. 5, cache controller 310 may include hazard manager 505, cache hit/miss check 510, hit block 515, miss block 520, and history storage 525. Upon receipt of a data request from processor 110 of FIG. 1 by dedupable cache 135 of FIG. 1, hazard manager 505 may track various sequences of commands, such as read-after-write and write-after-write, to ensure that data dependencies are handled correctly. For example, if cache controller 310 were to receive a request to write data that is stored in non-dedupable write buffer 330 of FIG. 3, and then receive a request to read that data before it has been written to backend high capacity memory 130 of FIG. 1, hazard manager 505 may direct the read request to access the data from non-dedupable write buffer 330 of FIG. 3. Cache hit/miss check 510 may determine whether a particular address being accessed may be found in dedupable cache 135 of FIG. 1. Since such a determination may be carried out by accessing metadata region 335 of FIG. 3, cache hit/miss check 510 may send a read request along the read/write signal to access metadata region 335 of FIG. 3.

Once cache hit/miss check 510 has determined whether a particular request accesses an address already in dedupable cache 135 of FIG. 1, control may be passed to either hit block 515 or miss block 520, as appropriate. Hit block 515 may be used to access a cache line currently stored in dedupable cache 135 of FIG. 1; miss block 520 may be used to access data from backend high capacity memory 130 of FIG. 3. Hit block 515 and miss block 520 may send read and/or write requests along the read/write signal to access data in DRAM 305 of FIG. 3: in addition, miss block 520 may also receive a write status signal from deduplication engine 405 of FIG. 4. Finally, history storage 525 may be used to determine information about the access history of the cache lines in dedupable cache 135 of FIG. 1: for example, to select a cache line to evict when appropriate. In addition, various network interconnects, such as those shown in FIG. 5, may support communication between the various elements of cache controller 310.

Now that the hardware of dedupable cache 135 of FIG. 3, and cache controller 310, has been explained, the operation of dedupable cache 135 of FIG. 3 may be explained. When dedupable cache 135 of FIG. 1 receives a request from processor 110 of FIG. 1, there are two types of requests, and two possible cache results: the request might be a read request or a write request, and the data in question might result in a cache hit or a cache miss. There are therefore a total of four possible cases, each of which is discussed below.

Read Request, Cache Hit

If processor 110 of FIG. 1 issued a read request, and the data is currently stored in dedupable read cache 325 of FIG. 3, then cache hit/miss check 510 of FIG. 5 will determine this case after reading metadata region 335 of FIG. 3. Since the data in question is currently in dedupable read cache 325 of FIG. 3, control may pass to hit block 515 of FIG. 5, which may send a read request to deduplication engine 405 of FIG. 4, requesting that the data be read from dedupable read cache 325 of FIG. 3. Deduplication engine 405 of FIG. 4 may then return the data to hit block 515 of FIG. 5, which may then return the data to processor 110 of FIG. 1 via host layer 315.

Read Request, Cache Miss

If processor 110 of FIG. 1 issued a read request, and the data is not currently stored in dedupable read cache 325 of FIG. 3, then cache hit/miss check 510 of FIG. 5 will determine this case after reading metadata region 335 of FIG. 3. Since the data in question is not currently in dedupable read cache 325 of FIG. 3, control may pass to miss block 520, which may request the data from backend high capacity memory 130 of FIG. 3 via media layer 320 of FIG. 3.

Once the data has been read, miss block 520 of FIG. 5 may determine if there is a cache line in dedupable read cache 325 of FIG. 3 that is not currently storing valid data. If there is an available cache line in dedupable read cache 325 of FIG. 3 not currently storing valid data, miss block 520 of FIG. 5 may select such a cache line to store the data. Otherwise, miss block 520 of FIG. 5 may select a cache line containing valid data to evict from dedupable read cache 325 of FIG. 3. This selection process may use the data from history storage 525 of FIG. 5, and may use any desired algorithm to select a cache line to evict: Least Recently Used (LRU) or Least Frequently Used (LFU) are well known examples of algorithms that may be used to select a cache line to evict.

To evict the cache line from dedupable read cache 325 of FIG. 3, miss block 520 of FIG. 5 may send a write operation to DRAM 305 of FIG. 3 to write into metadata region 335 of FIG. 3 to mark the cache line as invalid. Miss block 520 may also send a write operation to deduplication engine 405 of FIG. 4 to overwrite the actual data in dedupable read cache 325 of FIG. 3: for example, by writing enough zeroes to fill the cache line.

Once the cache line is evicted and the data invalidated, the cache line is then free to receive the data, just as if the cache line was available to begin with. Thus, miss block 520 of FIG. 5 may then send a write operation to deduplication engine 405 of FIG. 4 to write the data (read earlier from backend high capacity memory 130 of FIG. 1) into dedupable read cache 325 of FIG. 3. Cache controller 310 of FIG. 3 may then return the data to processor 110 of FIG. 1 via host layer 315 of FIG. 3.

Write Request, Cache Hit

If processor 110 of FIG. 1 issued a write request, and the data is currently stored in dedupable read cache 325 of FIG. 3, then cache hit/miss check 510 of FIG. 5 will determine this case after reading metadata region 335 of FIG. 3. Since the data in question is currently in dedupable read cache 325 of FIG. 3, control may pass to hit block 515.

Since dedupable read cache 325 of FIG. 3 currently stores the data to be replaced, the data in the cache line of dedupable read cache 325 of FIG. 3 should be handled as well. While the new data could be written to the cache line in dedupable read cache 325 of FIG. 3, writing data to deduplicated memory is a relatively slow operation (and the data stored in backend high capacity memory 130 of FIG. 1 needs to be updated as well in any case). Therefore, instead of writing the data to dedupable read cache 325 of FIG. 3, the cache line in dedupable read cache 325 of FIG. 3 may be invalidated. That way, if the data is later read by processor 110, the new values may be retrieved from non-dedupable write buffer 330 of FIG. 3 (if still present therein) or from backend high capacity memory 130 of FIG. 1 (as described above in the case labeled "Read Request, Cache Miss").

To invalidate the cache line from dedupable read cache 325 of FIG. 3, hit block 515 of FIG. 5 may send a write operation to DRAM 305 of FIG. 3 to write into metadata region 335 of FIG. 3 to mark the cache line as invalid. Hit block 515 may also send a write operation to deduplication engine 405 of FIG. 4 to overwrite the actual data in dedupable read cache 325 of FIG. 3: for example, by writing enough zeroes to fill the cache line.

Once the data has been invalidated from dedupable read cache 325 of FIG. 3, hit block 515 of FIG. 5 may write the data to non-dedupable write buffer 330 of FIG. 3. Since non-dedupable write buffer 330 of FIG. 3 does not use deduplicated memory, writing the data to non-dedupable write buffer 330 of FIG. 3 is faster than writing the data to dedupable read cache 325 of FIG. 3. Later, at an appropriate time, the data may be flushed from non-dedupable write buffer 330 of FIG. 3 to backend high capacity memory 130 of FIG. 3 via media layer 320 of FIG. 3: for example, if non-dedupable write buffer 330 of FIG. 3 becomes full.

Write Request, Cache Miss

If processor 110 of FIG. 1 issued a write request, and the data is not currently stored in dedupable read cache 325 of FIG. 3, then cache hit/miss check 510 of FIG. 5 will determine this case after reading metadata region 335 of FIG. 3. Since the data in question is not currently in dedupable read cache 325 of FIG. 3, control may pass to miss block 520.

Miss block 520 of FIG. 5 may write the data to non-dedupable write buffer 330 of FIG. 3. Later, at an appropriate time, the data may be flushed from non-dedupable write buffer 330 of FIG. 3 to backend high capacity memory 130 of FIG. 3 via media layer 320 of FIG. 3: again, for example, if non-dedupable write buffer 330 of FIG. 3 becomes full.

The above discussion shows how dedupable memory may be used in caches to improve overall performance. But the use of dedupable memory may introduce another complication, which may specifically arise the cases of Read Request, Cache Miss and Write Request, Cache Hit. Note that in those two cases, data may be written to dedupable read cache 325 of FIG. 3. The problem stems from the fact that because dedupable read cache 325 of FIG. 3 simulates a larger capacity than its physical capacity. Even though a cache line might be available, the physical memory of dedupable read cache 325 of FIG. 3 might be filled, in which case data may not be successfully written to dedupable read cache 325 of FIG. 3. In addition, invalidating a cache line in dedupable read cache 325 of FIG. 3 might not free up any physical memory. For example, if the cache line selected for invalidation references data that is also referenced by another cache line, invalidating the selected cache line does not result in the data actually be freed from the physical memory of dedupable read cache 325 of FIG. 3. This problem may be described as the lack of a write guarantee.

One solution is to simply accept that a write to dedupable read cache 325 of FIG. 3 might fail. This solution is reasonable, at least in the case of Read Request, Cache Miss: in the worst case, the data is not actually cached at least until the data may actually be cached in dedupable read cache 325 of FIG. 3, requiring access from backend high capacity memory 130 of FIG. 1 (at least until the data may actually be cached in dedupable read cache 325 of FIG. 3). And even in the case of Write Request, Cache Hit, the solution is acceptable if there is a way to invalidate all the cache lines that access that same data (to avoid accesses to the other cache lines from accessing stale data from dedupable read cache 325 of FIG. 3). But there are other solutions.

Another solution is to invalidate multiple cache lines, until the data may be successfully written to dedupable read cache 325 of FIG. 3 (or until a threshold number of retries has been made). If, after an attempt to write data to dedupable read cache 325 of FIG. 3, duplication engine 405 of FIG. 4 returns a NAK in the write status signal, cache controller 310 of FIG. 3 (via either hit block 515 of FIG. 5 or miss block 520 of FIG. 5) may select a cache line from dedupable read cache 325 of FIG. 3 to invalidate. After the selected cache line is invalidated, cache controller 310 of FIG. 3 (again, via either hit block 515 of FIG. 5 or miss block 520 of FIG. 5) may retry the original write to dedupable read cache 325 of FIG. 3. This process may be repeated as often as necessary, until either the write to dedupable read cache 325 of FIG. 3 succeeds (as indicated by an ACK on the write status signal) or until the threshold number of retries has occurred.

Figure 6A:
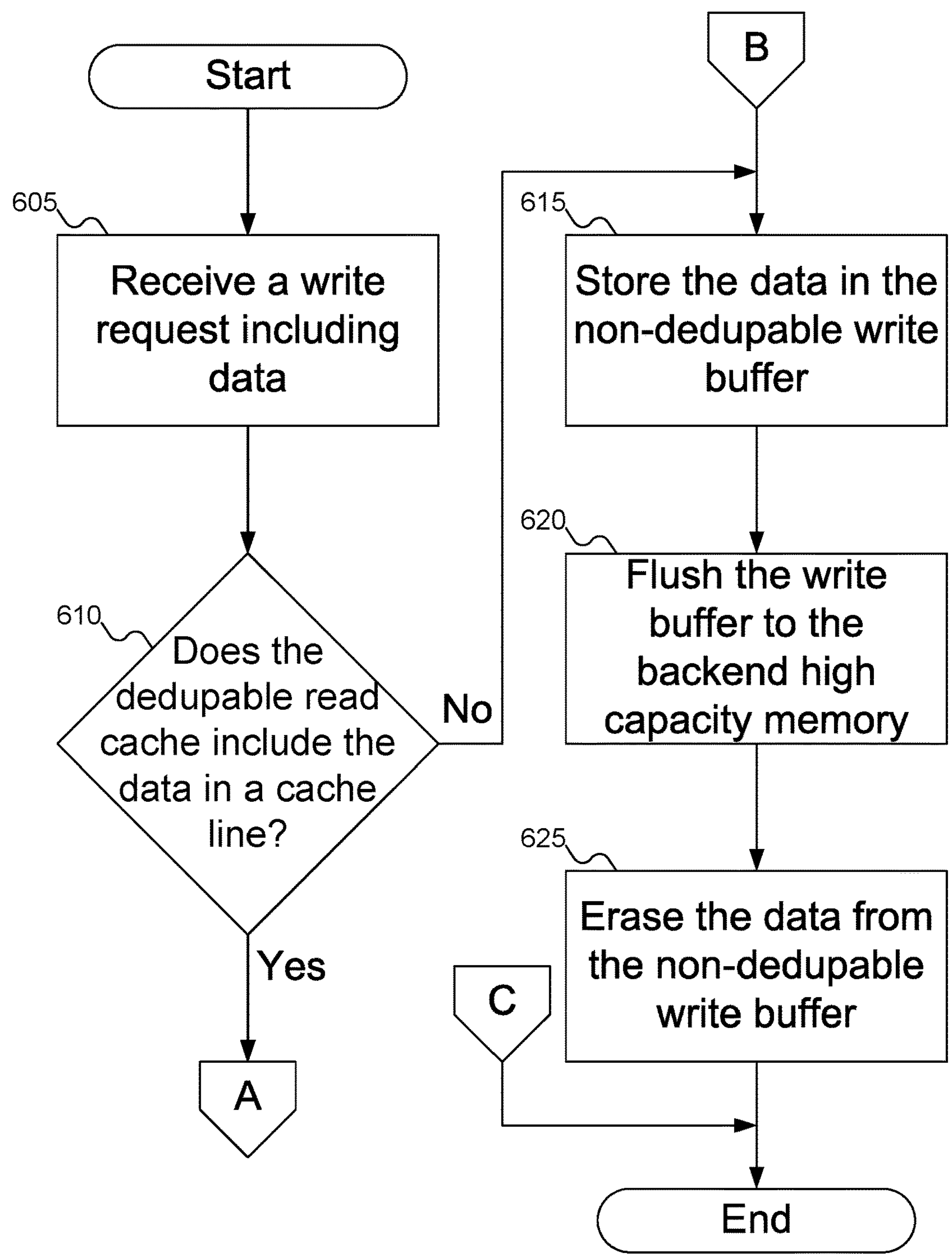
FIGS. 6A-6B show a flowchart of an example procedure for the deduplication cache of FIG. 1 to process a write request, according to an embodiment of the inventive concept.
Figure 6B:
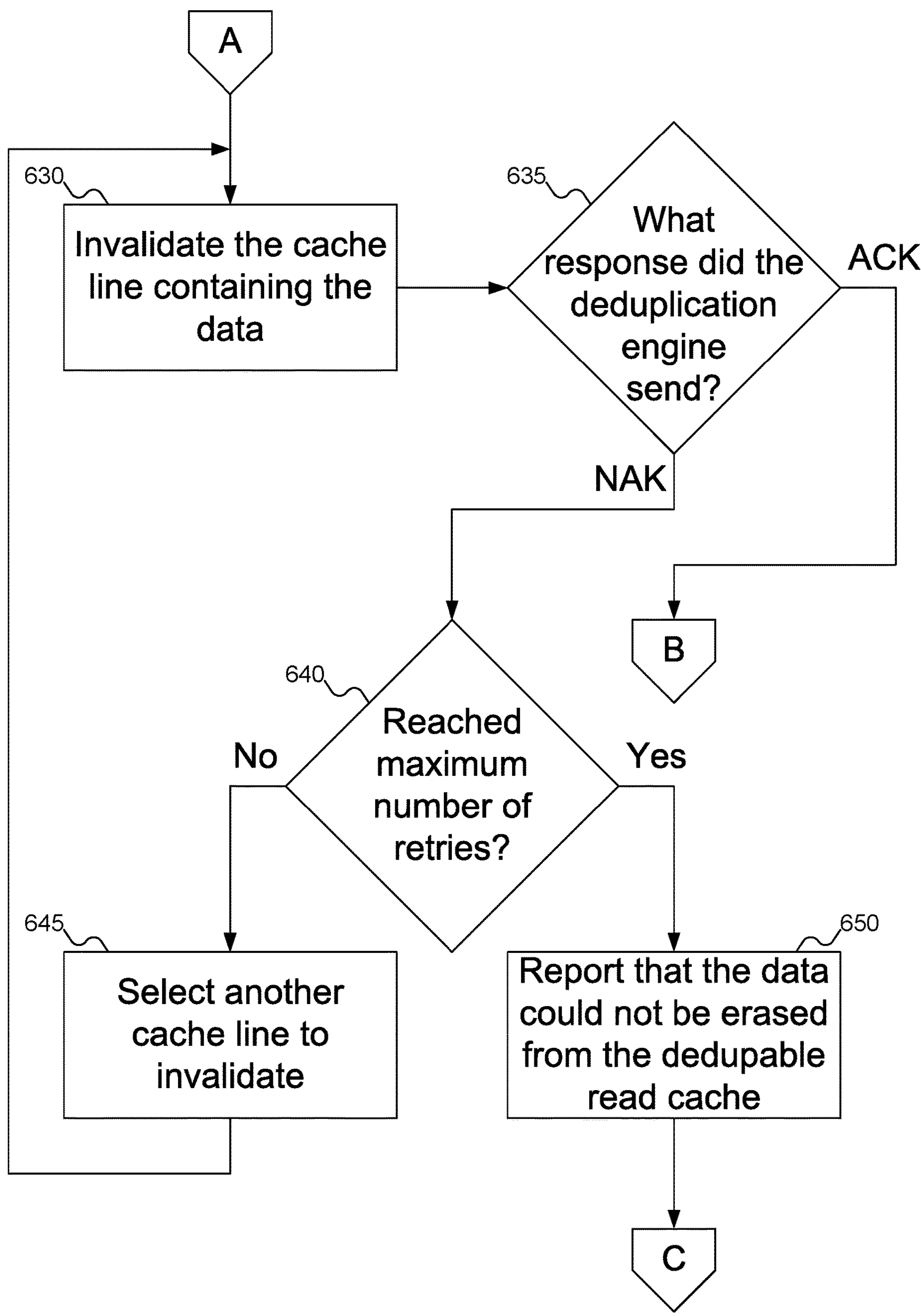

FIGS. 6A-6B show a flowchart of an example procedure for deduplication cache 135 of FIG. 1 to process a write request, according to an embodiment of the inventive concept. In FIG. 6A, at block 605, cache controller 310 of FIG. 3 may receive a write request from processor 110 of FIG. 1. At block 610, cache hit/miss check 510 of FIG. 5 may determine whether dedupable read cache 325 of FIG. 3 includes a cache line containing the data to be overwritten. If not, then at block 615 miss block 520 of FIG. 5 may store the data from the write request in non-dedupable write buffer 330 of FIG. 3, at block 620, cache controller 310 of FIG. 3 may flush the data from non-dedupable write buffer 330 of FIG. 3 to backend high capacity memory 130 of FIG. 1, and at block 625, cache controller 310 of FIG. 3 may erase the data from non-dedupable write buffer 330 of FIG. 3.

On the other hand, at block 610, if dedupable read cache 325 of FIG. 3 does include a cache line containing the data to be overwritten by the write request, then at block 630 (FIG. 6B) hit block 515 of FIG. 5 may invalidate the cache line (by marking the cache line as invalid in metadata region 335 of FIG. 3 and writing zeroes to the cache line via deduplication engine 405 of FIG. 4). At block 635, hit block 515 of FIG. 5 may determine whether deduplication engine 405 of FIG. 4 responded with either an ACK or a NAK signal. If deduplication engine 405 of FIG. 4 returned an ACK signal, then processing may continue with block 615 of FIG. 6A to complete the write request. Otherwise, at block 640, hit block 515 of FIG. 5 may determine if the maximum number of retries has been reached. If the maximum number of retries has not yet been reached, then at block 645, hit block 515 of FIG. 5 may select another cache line to invalidate, and processing may return to block 630 to invalidate the newly selected cache line. Otherwise, at block 650, hit block 515 (and cache controller 310 of FIG. 3) may report that there was a problem erasing the data from dedupable read cache 325 of FIG. 3, after which processing may end.

Figure 7:
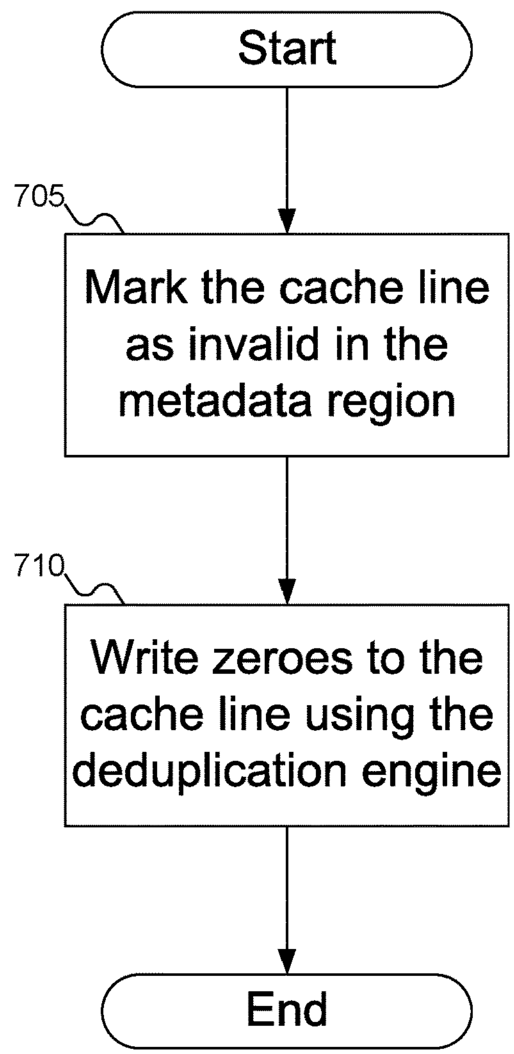
FIG. 7 shows a flowchart of an example procedure for the deduplication cache of FIG. 1 to invalidate a cache line in the dedupable read cache of FIG. 3, according to an embodiment of the inventive concept.

FIG. 7 shows a flowchart of an example procedure for deduplication cache 135 of FIG. 1 to invalidate a cache line in dedupable read cache 325 of FIG. 3, according to an embodiment of the inventive concept. In FIG. 7, at block 705, cache controller 310 of FIG. 3 may mark the cache line as invalid in metadata region 335 of FIG. 3 (by writing an appropriate value into metadata region 335 of FIG. 3). At block 710, cache controller 310 of FIG. 3 may send a write request to deduplication engine 405 of FIG. 4 to write zeroes into the data of the cache line in question, ensuring that the stale data may not occupy DRAM space.

Figure 8A:
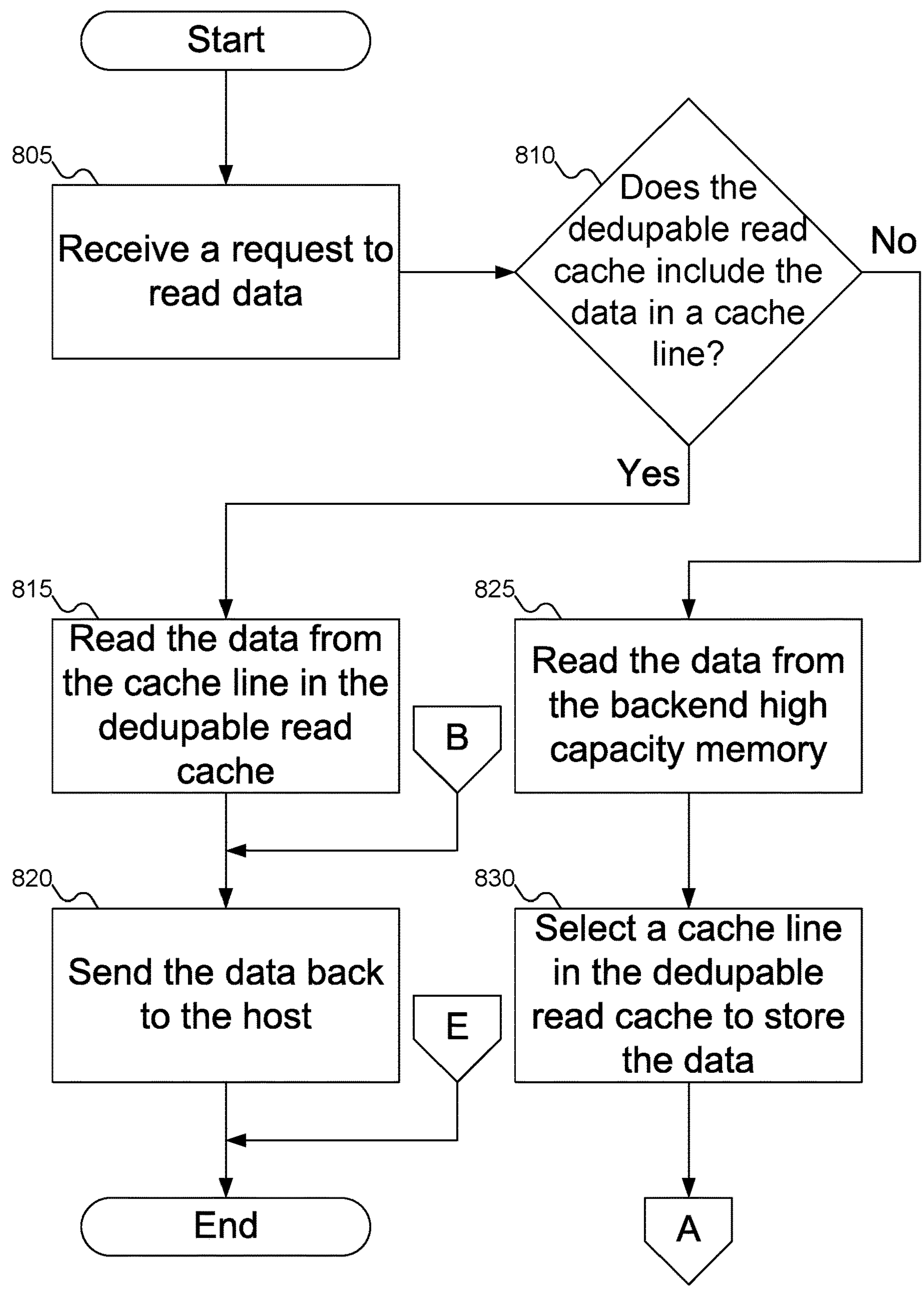
FIGS. 8A-8C show a flowchart of an example procedure for the deduplication cache of FIG. 1 to process a read request, according to an embodiment of the inventive concept.
Figure 8B:
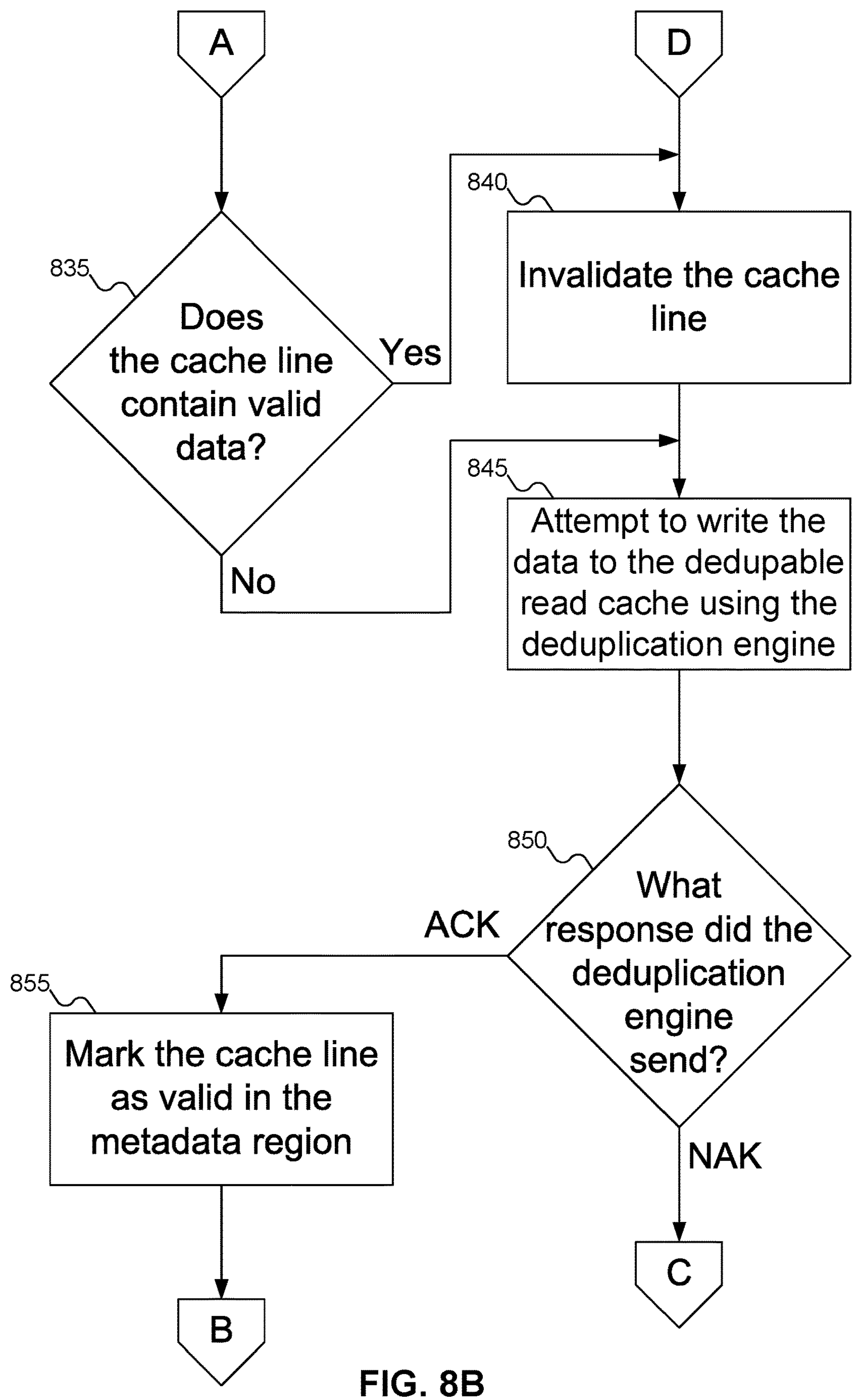
Figure 8C:
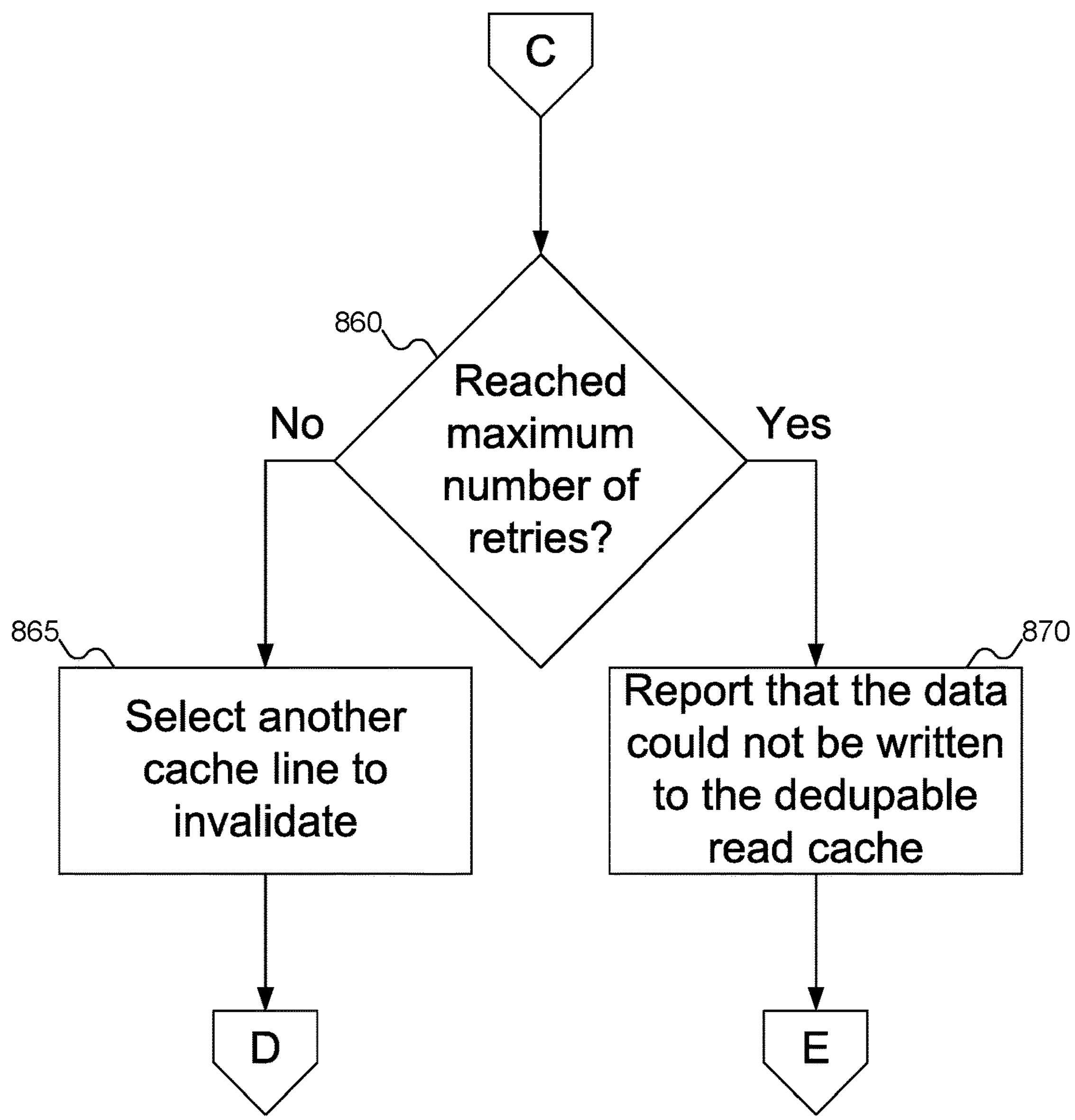

FIGS. 8A-8C show a flowchart of an example procedure for deduplication cache 135 of FIG. 1 to process a read request, according to an embodiment of the inventive concept. In FIG. 8A, at block 805, cache controller 310 of FIG. 3 may receive a read request to read data from backend high capacity memory 130 of FIG. 1 (or from DRAM 305 of FIG. 3, if the data is stored therein). At block 810, cache hit/miss check 510 of FIG. 5 may check to see if the data being requested is found in dedupable read cache 325 of FIG. 3. If the data being requested is found in a cache line in dedupable read cache 325 of FIG. 3, then at block 815 hit block 515 of FIG. 5 may send a read request to deduplication engine 405 of FIG. 4 to read the requested data from the cache line in dedupable read cache 325 of FIG. 3, and at block 820 cache controller 310 of FIG. 3 may send the requested data back to processor 110 of FIG. 1, after which processing ends.

If the requested data is not found in a cache line in either dedupable read cache 325 or non-dedupable write buffer 330 of FIG. 3, then at block 825 miss block 520 of FIG. 5 may read the data from backend high capacity memory 130 of FIG. 1. At block 830, miss block 520 of FIG. 5 may select a cache line from dedupable read cache 325 of FIG. 3 to store the data. Note that the selected cache line may be a cache line not currently storing valid data, or a cache line that stored valid data (and therefore needs to be invalidated first). At block 835 (FIG. 8B), miss block 520 of FIG. 5 determines whether the selected cache line contains valid data or not. If the selected cache line contains valid data, then at block 840 miss block 520 of FIG. 5 may invalidate the cache line, using the example procedure outlined in FIG. 7 above. Then, once the cache line is known not to contain valid data, at block 845 miss block 520 of FIG. 5 may send a write request to deduplication engine 405 of FIG. 4 to write the requested data to the selected cache line in dedupable read cache 325 of FIG. 3. That is, at block 845, miss block 520 of FIG. 5 may provide the requested data to deduplication engine 405 of FIG. 4 to attempt to write the requested data to the selected cache line in dedupable read cache 325 of FIG. 3.

At block 850, miss block 520 of FIG. 5 may determine which deduplication engine 405 of FIG. 4 returned an ACK or a NAK in response to the write request. Note that deduplication engine 405 of FIG. 4 might return a NAK regardless of whether or not the selected cache line had contained valid data at block 835, since dedupable read cache 325 of FIG. 3 might have reached its maximum physical capacity even with free cache lines. If deduplication engine 405 of FIG. 4 returned an ACK signal, then the write was successful: at block 855 miss block 520 of FIG. 5 may mark the cache line in metadata region 335 of FIG. 3 as containing valid data, and processing may continue with block 820 of FIG. 8A to send the requested data back to processor 110 of FIG. 1.

On the other hand, if deduplication engine 405 of FIG. 4 returned a NAK signal, then deduplication engine 405 of FIG. 4 was not able to write the data to the cache line in dedupable read cache 325 of FIG. 3. In that case, at block 860 (FIG. 8C), miss block 520 of FIG. 5 may determine if the maximum number of retries has been reached. If the maximum number of retries has not yet been reached, then at block 865, miss block 520 of FIG. 5 may select another cache line to invalidate, and processing may return to block 840 to invalidate the newly selected cache line. Otherwise, at block 870, miss block 520 (and cache controller 310 of FIG. 3) may report that there was a problem writing the data to dedupable read cache 325 of FIG. 3, after which processing may end.

As discussed above with reference to FIG. 3, in some embodiments of the inventive concept, non-dedupable write buffer 330 of FIG. 3 may also act as a conventional cache, alongside dedupable read cache 325 of FIG. 3. In such embodiments of the inventive concept, references to checking or accessing dedupable read cache 325 of FIG. 3 for the requested cache line may be understood to similarly involve checking or accessing non-dedupable write buffer 330 of FIG. 3. For example, in FIG. 8A, block 810 may be modified to check both dedupable read cache 325 of FIG. 3 and non-dedupable write buffer 330 of FIG. 3 for the cache line including the data, and block 815 may be modified to read the data from the cache line in either dedupable read cache 325 of FIG. 3 or non-dedupable write buffer 330 of FIG. 3, depending on where the data may be actually be found. Similarly, if in block 870 of FIG. 8C the data could not be successfully written to dedupable read cache 325 of FIG. 3, the data may be written to non-dedupable write buffer 330 of FIG. 3 as an alternative. Or, the example flowchart might be modified to select a cache line from either dedupable read cache 325 of FIG. 3 or non-dedupable write buffer 330 of FIG. 3 into which the data might be written, rather than attempting to write the data first into a cache line in dedupable read cache 325 of FIG. 3.

In FIGS. 6A-8C, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Embodiments of the inventive concept offer several technical advantages over the prior art. First, the use of dedupable memory in deduplication cache 135 of FIG. 1 avoids multiple copies of the same data being stored in cache DRAM 305 of FIG. 3, allowing for more (unique) data to be stored in the same physical amount of memory (or alternatively, using a smaller memory footprint to store the same amount of data). For example, if dedupable read cache 325 of FIG. 3 includes 4 GB of memory with an expected duplication ratio of 2, dedupable read cache 325 of FIG. 3 may theoretically store as much unique data as could be stored in 8 GB of non-dedupable cache memory. Second, by using non-dedupable write buffer 330 of FIG. 3, the delays inherent in writing to dedupable memory are avoided for those situations where applications are writing data (rather than just reading data). Third, the concern about writes to dedupable read cache 325 of FIG. 3 not being guaranteed are reduced by supporting write retries after invalidating cache lines in dedupable read cache 325 of FIG. 3 (and while the possibility still exists that a write to dedupable read cache 325 of FIG. 3 might not succeed even after several cache line invalidations, the likelihood of such occurrences are quite low).

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a dedupable cache, comprising:

a cache memory, the cache memory including a dedupable read cache and a non-dedupable write buffer;

a deduplication engine to manage data reads and writes using the dedupable read cache, the deduplication engine operative to send a write status signal indicating whether a write request to the dedupable read cache was successful or not; and a cache controller, including:

- a cache hit/miss check logic to check whether an address in a request may be found in the dedupable read cache;
- a hit block to access a first data from the cache memory when the cache hit/miss check logic indicates the address may be found in the dedupable read cache;
- a miss block to access a second data from a backend high capacity memory when the cache hit/miss check logic indicates the address may not be found in the dedupable read cache; and a history storage to store information about accesses to the first data in the dedupable read cache.

Statement 2. An embodiment of the inventive concept includes a dedupable cache according to statement 1, wherein the cache controller further includes a hazard manager 505) to manage data dependencies in the dedupable read cache and the non-dedupable write buffer.

Statement 3. An embodiment of the inventive concept includes a dedupable cache according to statement 1, wherein the dedupable read cache simulates storing more cache lines than physically fit in the dedupable read cache.

Statement 4. An embodiment of the inventive concept includes a dedupable cache according to statement 1, wherein the cache memory further includes a metadata region to store information about cache lines in the dedupable read cache.

Statement 5. An embodiment of the inventive concept includes a dedupable cache according to statement 1, wherein:

the cache controller is operative to receive a first write request from a processor to write a data and store the data in the non-dedupable write buffer; and the hit block is operative to send a second write request to the deduplication engine to invalidate a cache line in the dedupable read cache when the cache line is modified by the first write request.

Statement 6. An embodiment of the inventive concept includes a dedupable cache according to statement 5, wherein the second write request includes a request to write zeroes to the cache line in the dedupable read cache.

Statement 7. An embodiment of the inventive concept includes a dedupable cache according to statement 5, wherein the cache controller is further operative to mark the cache line as invalid in a metadata region of the cache memory.

Statement 8. An embodiment of the inventive concept includes a dedupable cache according to statement 5, wherein the hit block is further operative to receive a no acknowledgement signal from the deduplication engine responsive to the second write request, evict a second cache line from the dedupable read cache, and resend the second write request to the deduplication engine after evicting the second cache line from the dedupable read cache.

Statement 9. An embodiment of the inventive concept includes a dedupable cache according to statement 1, wherein:

the cache controller is operative to receive a read request from a processor to read a data and send the data to the processor; and the miss block is operative to retrieve the data from the backend high capacity memory and send a write request to the deduplication engine to write the data into the dedupable read cache.

Statement 10. An embodiment of the inventive concept includes a dedupable cache according to statement 9, wherein the miss block is further operative to receive a no acknowledgement signal from the deduplication engine responsive to the write request, evict a cache line from the dedupable read cache, and resend the write request to the deduplication engine after evicting the cache line from the dedupable read cache.

Statement 11. An embodiment of the inventive concept includes a method, comprising:

receiving a write request to write data;

determining that the data is in a cache line in a dedupable read cache, the dedupable read cache being a first region in a cache memory, the cache memory including a non-dedupable write buffer as a second region;

invalidating the cache line in the dedupable read cache; and storing the data in a non-dedupable write buffer.

Statement 12. An embodiment of the inventive concept includes a method according to statement 11, further comprising:

flushing the data from the non-dedupable write buffer to a backend high capacity memory; and erasing the data from the non-dedupable write buffer.

Statement 13. An embodiment of the inventive concept includes a method according to statement 11, wherein invalidating the cache line in the dedupable read cache includes:

marking the cache line as invalid in a metadata region in the cache memory; and writing zeroes to the cache line via a deduplication engine.

Statement 14. An embodiment of the inventive concept includes a method according to statement 13, wherein invalidating the cache line in the dedupable read cache further includes receiving an acknowledgement on a write status signal from the deduplication engine.

Statement 15. An embodiment of the inventive concept includes a method according to statement 13, wherein invalidating the cache line in the dedupable read cache further includes:

receiving a no acknowledgement on a write status signal from the deduplication engine;

selecting a second cache line from the dedupable read cache to evict;

invalidating the second cache line; and writing zeroes to the second cache line via the deduplication engine.

Statement 16. An embodiment of the inventive concept includes a method according to statement 11, wherein storing the data in a non-dedupable write buffer includes storing the data in the non-dedupable write buffer regardless of whether the data is in the cache line in the dedupable read cache.

Statement 17. An embodiment of the inventive concept includes a method, comprising:

receiving a read request to read data;

determining that the data is not in a plurality of cache lines in a dedupable read cache, the dedupable read cache being a first region in a cache memory, the cache memory including a non-dedupable write buffer as a second region;

reading the data from a backend high capacity memory;

selecting a first cache line in the dedupable read cache;

providing the data to a deduplication engine to attempt to write the data to the first cache line; and sending the data in response to the read request.

Statement 18. An embodiment of the inventive concept includes a method according to statement 17, wherein selecting a first cache line in the dedupable read cache includes selecting the first cache line in the dedupable read cache not currently storing data.

Statement 19. An embodiment of the inventive concept includes a method according to statement 17, wherein selecting a first cache line in the dedupable read cache includes:

selecting the first cache line in the dedupable read cache currently storing valid data to evict responsive to dedupable read cache metadata from a metadata region in the cache memory and history data; and invalidating the first cache line.

Statement 20. An embodiment of the inventive concept includes a method according to statement 19, wherein invalidating the first cache line includes:

marking the first cache line as invalid in the metadata region in the cache memory; and writing zeroes to the first cache line via the deduplication engine.

Statement 21. An embodiment of the inventive concept includes a method according to statement 17, wherein providing the data to a deduplication engine to attempt to write the data to the first cache line receiving an acknowledgement on a write status signal from the deduplication engine.

Statement 22. An embodiment of the inventive concept includes a method according to statement 17, wherein providing the data to a deduplication engine to attempt to write the data to the first cache line includes:

receiving a no acknowledgement on a write status signal from the deduplication engine;

selecting a second cache line from the dedupable read cache currently storing valid data to evict responsive to dedupable read cache metadata from a metadata region in the cache memory and history data;

invalidating the second cache line; and providing the data to the deduplication engine to attempt to write the data to the selected second cache line.

Statement 23. An embodiment of the inventive concept includes an article, comprising a non-transitory storage medium, the non-transitory storage medium having stored thereon instructions that, when executed by a machine, result in:

receiving a write request to write data;

determining that the data is in a cache line in a dedupable read cache, the dedupable read cache being a first region in a cache memory, the cache memory including a non-dedupable write buffer as a second region;

invalidating the cache line in the dedupable read cache; and storing the data in a non-dedupable write buffer.

Statement 24. An embodiment of the inventive concept includes an article according to statement 23, the non-transitory storage medium having stored thereon further instructions that, when executed by the machine, result in:

flushing the data from the non-dedupable write buffer to a backend high capacity memory; and erasing the data from the non-dedupable write buffer.

Statement 25. An embodiment of the inventive concept includes an article according to statement 23, wherein invalidating the cache line in the dedupable read cache includes:

marking the cache line as invalid in a metadata region in the cache memory; and writing zeroes to the cache line via a deduplication engine.

Statement 26. An embodiment of the inventive concept includes an article according to statement 25, wherein invalidating the cache line in the dedupable read cache further includes receiving an acknowledgement on a write status signal from the deduplication engine.

Statement 27. An embodiment of the inventive concept includes an article according to statement 25, wherein invalidating the cache line in the dedupable read cache further includes:

receiving a no acknowledgement on a write status signal from the deduplication engine;

selecting a second cache line from the dedupable read cache to evict;

invalidating the second cache line; and writing zeroes to the second cache line via the deduplication engine.

Statement 28. An embodiment of the inventive concept includes an article according to statement 23, wherein storing the data in a non-dedupable write buffer includes storing the data in the non-dedupable write buffer regardless of whether the data is in the cache line in the dedupable read cache.

Statement 29. An embodiment of the inventive concept includes an article, comprising a non-transitory storage medium, the non-transitory storage medium having stored thereon instructions that, when executed by a machine, result in:

receiving a read request to read data;

determining that the data is not in a plurality of cache lines in a dedupable read cache, the dedupable read cache being a first region in a cache memory, the cache memory including a non-dedupable write buffer as a second region;

reading the data from a backend high capacity memory;

selecting a first cache line in the dedupable read cache;

providing the data to a deduplication engine to attempt to write the data to the first cache line; and sending the data in response to the read request.

Statement 30. An embodiment of the inventive concept includes an article according to statement 29, wherein selecting a first cache line in the dedupable read cache includes selecting the first cache line in the dedupable read cache not currently storing data.

Statement 31. An embodiment of the inventive concept includes an article according to statement 29, wherein selecting a first cache line in the dedupable read cache includes:

selecting the first cache line in the dedupable read cache currently storing valid data to evict responsive to dedupable read cache metadata from a metadata region in the cache memory and history data; and invalidating the first cache line.

Statement 32. An embodiment of the inventive concept includes an article according to statement 31, wherein invalidating the first cache line includes:

marking the first cache line as invalid in the metadata region in the cache memory; and writing zeroes to the first cache line via the deduplication engine.

Statement 33. An embodiment of the inventive concept includes an article according to statement 29, wherein providing the data to a deduplication engine to attempt to write the data to the first cache line receiving an acknowledgement on a write status signal from the deduplication engine.

Statement 34. An embodiment of the inventive concept includes an article according to statement 29, wherein providing the data to a deduplication engine to attempt to write the data to the first cache line includes:

receiving a no acknowledgement on a write status signal from the deduplication engine;

selecting a second cache line from the dedupable read cache currently storing valid data to evict responsive to dedupable read cache metadata from a metadata region in the cache memory and history data;

invalidating the second cache line; and providing the data to the deduplication engine to attempt to write the data to the selected second cache line.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A dedupable cache, comprising:

a cache memory, the cache memory including a dedupable read cache and a non-dedupable write buffer;

a deduplication engine to manage data reads and writes using the dedupable read cache, the deduplication engine operative to send a write status signal indicating whether a write request to the dedupable read cache was successful or not; and a cache controller, including:

a cache hit/miss check logic to check whether an address in a request may be found in the dedupable read cache;

a hit block to access a first data from the cache memory when the cache hit/miss check logic indicates the address may be found in the dedupable read cache;

a miss block to access a second data from a backend high capacity memory when the cache hit/miss check logic indicates the address may not be found in the dedupable read cache; and a history storage to store information about accesses to the first data in the dedupable read cache.

2. A dedupable cache according to claim 1, wherein the dedupable read cache simulates storing more cache lines than physically fit in the dedupable read cache.

3. A dedupable cache according to claim 1, wherein the cache memory further includes a metadata region to store information about cache lines in the dedupable read cache.

4. A dedupable cache according to claim 1, wherein:

the cache controller is operative to receive a first write request from a processor to write a data and store the data in the non-dedupable write buffer; and the hit block is operative to send a second write request to the deduplication engine to invalidate a cache line in the dedupable read cache when the cache line is modified by the first write request.

5. A dedupable cache according to claim 4, wherein the second write request includes a request to write zeroes to the cache line in the dedupable read cache.

6. A dedupable cache according to claim 4, wherein the cache controller is further operative to mark the cache line as invalid in a metadata region of the cache memory.

7. A dedupable cache according to claim 4, wherein the hit block is further operative to receive a no acknowledgement signal from the deduplication engine responsive to the second write request, evict a second cache line from the dedupable read cache, and resend the second write request to the deduplication engine after evicting the second cache line from the dedupable read cache.

8. A dedupable cache according to claim 1, wherein:

the cache controller is operative to receive a read request from a processor to read a data and send the data to the processor; and the miss block is operative to retrieve the data from the backend high capacity memory and send a write request to the deduplication engine to write the data into the dedupable read cache.

9. A dedupable cache according to claim 8, wherein the miss block is further operative to receive a no acknowledgement signal from the deduplication engine responsive to the write request, evict a cache line from the dedupable read cache, and resend the write request to the deduplication engine after evicting the cache line from the dedupable read cache.

10. A dedupable cache according to claim 1, wherein the dedupable read cache included deduplication memory, wherein data in the deduplication memory is subject to deduplication.

11. A method, comprising:

receiving a write request to write data;

determining that the data is in a cache line in a dedupable read cache, the dedupable read cache being a first region in a cache memory, the cache memory including a non-dedupable write buffer as a second region;

invalidating the cache line in the dedupable read cache; and storing the data in a non-dedupable write buffer.

12. A method according to claim 11, wherein invalidating the cache line in the dedupable read cache includes:

marking the cache line as invalid in a metadata region in the cache memory; and writing zeroes to the cache line via a deduplication engine.

13. A method according to claim 12, wherein invalidating the cache line in the dedupable read cache further includes receiving an acknowledgement on a write status signal from the deduplication engine.

14. A method according to claim 12, wherein invalidating the cache line in the dedupable read cache further includes:

receiving a no acknowledgement on a write status signal from the deduplication engine;

selecting a second cache line from the dedupable read cache to evict;

invalidating the second cache line; and writing zeroes to the second cache line via the deduplication engine.

15. A method according to claim 11, wherein storing the data in a non-dedupable write buffer includes storing the data in the non-dedupable write buffer regardless of whether the data is in the cache line in the dedupable read cache.

16. A method, comprising:

receiving a read request to read data;

determining that the data is not in a plurality of cache lines in a dedupable read cache, the dedupable read cache being a first region in a cache memory, the cache memory including a non-dedupable write buffer as a second region;

reading the data from a backend high capacity memory;

selecting a first cache line in the dedupable read cache;

providing the data to a deduplication engine to attempt to write the data to the first cache line; and sending the data in response to the read request.

17. A method according to claim 16, wherein selecting a first cache line in the dedupable read cache includes selecting the first cache line in the dedupable read cache not currently storing data.

18. A method according to claim 16, wherein selecting a first cache line in the dedupable read cache includes:

selecting the first cache line in the dedupable read cache currently storing valid data to evict responsive to dedupable read cache metadata from a metadata region in the cache memory and history data; and invalidating the first cache line.

19. A method according to claim 18, wherein invalidating the first cache line includes:

marking the first cache line as invalid in the metadata region in the cache memory; and writing zeroes to the first cache line via the deduplication engine.

20. A method according to claim 16, wherein providing the data to a deduplication engine to attempt to write the data to the first cache line receiving an acknowledgement on a write status signal from the deduplication engine.

21. A method according to claim 16, wherein providing the data to a deduplication engine to attempt to write the data to the first cache line includes:

receiving a no acknowledgement on a write status signal from the deduplication engine;

selecting a second cache line from the dedupable read cache currently storing valid data to evict responsive to dedupable read cache metadata from a metadata region in the cache memory and history data;

invalidating the second cache line; and providing the data to the deduplication engine to attempt to write the data to the selected second cache line.

* * * * *